(12) United States Patent
Kritzer et al.

(10) Patent No.: US 9,227,680 B2
(45) Date of Patent: Jan. 5, 2016

(54) BICYCLE HUB LOCKING MECHANISM AND PARKING SYSTEM

(71) Applicants: Michael Kritzer, Boulder, CO (US); Alex Bogusky, Boulder, CO (US)

(72) Inventors: Michael Kritzer, Boulder, CO (US); Alex Bogusky, Boulder, CO (US)

(73) Assignee: B-CYCLE, LLC, Waterloo, WI (US)

( * ) Notice: Subject to any disclaimer, the term of this patent is extended or adjusted under 35 U.S.C. 154(b) by 0 days.

(21) Appl. No.: 13/797,678

(22) Filed: Mar. 12, 2013

(65) Prior Publication Data

US 2013/0193091 A1     Aug. 1, 2013

Related U.S. Application Data

(63) Continuation of application No. 12/856,002, filed on Aug. 13, 2010, now abandoned.

(60) Provisional application No. 61/233,648, filed on Aug. 13, 2009.

(51) Int. Cl.
| | |
|---|---|
| *B62H 5/00* | (2006.01) |
| *B60B 7/00* | (2006.01) |
| *B60B 7/06* | (2006.01) |
| *B60B 27/02* | (2006.01) |
| *B62H 3/04* | (2006.01) |
| *E05B 47/06* | (2006.01) |
| *E05B 51/02* | (2006.01) |
| *E05B 71/00* | (2006.01) |

(52) U.S. Cl.
CPC *B62H 5/005* (2013.01); *B60B 7/00* (2013.01); *B60B 7/061* (2013.01); *B60B 27/023* (2013.01); *B62H 3/04* (2013.01); *E05B 47/0603* (2013.01); *E05B 51/02* (2013.01); *E05B 71/00* (2013.01); *Y10T 70/5881* (2013.01)

(58) Field of Classification Search
CPC ............ B62H 5/005; B62H 3/04; B60B 7/00; B60B 7/061; B60B 27/023; E05B 47/0603; E05B 51/02; B05B 71/00
USPC .......... 70/233, 49, 235, 234, 236, 389; 211/5; 280/293; 248/551, 552, 553
See application file for complete search history.

(56) References Cited

U.S. PATENT DOCUMENTS

| | | | | |
|---|---|---|---|---|
| 4,817,939 | A * | 4/1989 | Augspurger et al. | ........... 482/61 |
| 5,628,214 | A * | 5/1997 | Evers | ............... 70/227 |
| 5,875,662 | A * | 3/1999 | Denby et al. | .................... 70/233 |
| 2004/0113437 | A1* | 6/2004 | Hayakawa et al. | ........... 292/201 |
| 2007/0220933 | A1* | 9/2007 | Gagosz et al. | .................. 70/233 |
| 2009/0266673 | A1* | 10/2009 | Dallaire et al. | ............... 194/205 |

FOREIGN PATENT DOCUMENTS

WO     WO 2010058127 A1 *  5/2010

* cited by examiner

*Primary Examiner* — Joseph Rocca
*Assistant Examiner* — Jacob Knutson

(57) ABSTRACT

A bicycle and bicycle parking and lock system wherein a hub locking device that is secured to a bicycle cooperates with a parking rack. The bicycle includes an engagement member that is secured to an axle of the bicycle. The engagement member selectively removably cooperates with a recess formed in the parking and lock system. The parking and lock system includes a number of upstanding members that are positioned to generally flank the front wheel of a bicycle to maintain the bicycle in a generally upright orientation. Each or select number of the upstanding members include a lock system that cooperates with the locking engagement member so as to secure the respective bicycle with respect to the parking system.

6 Claims, 7 Drawing Sheets

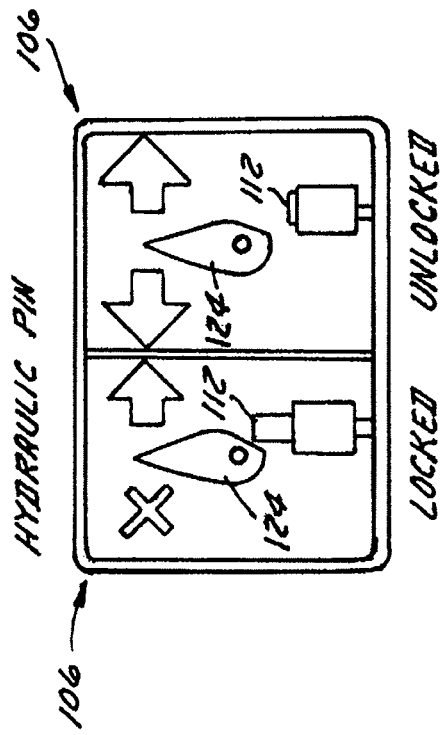
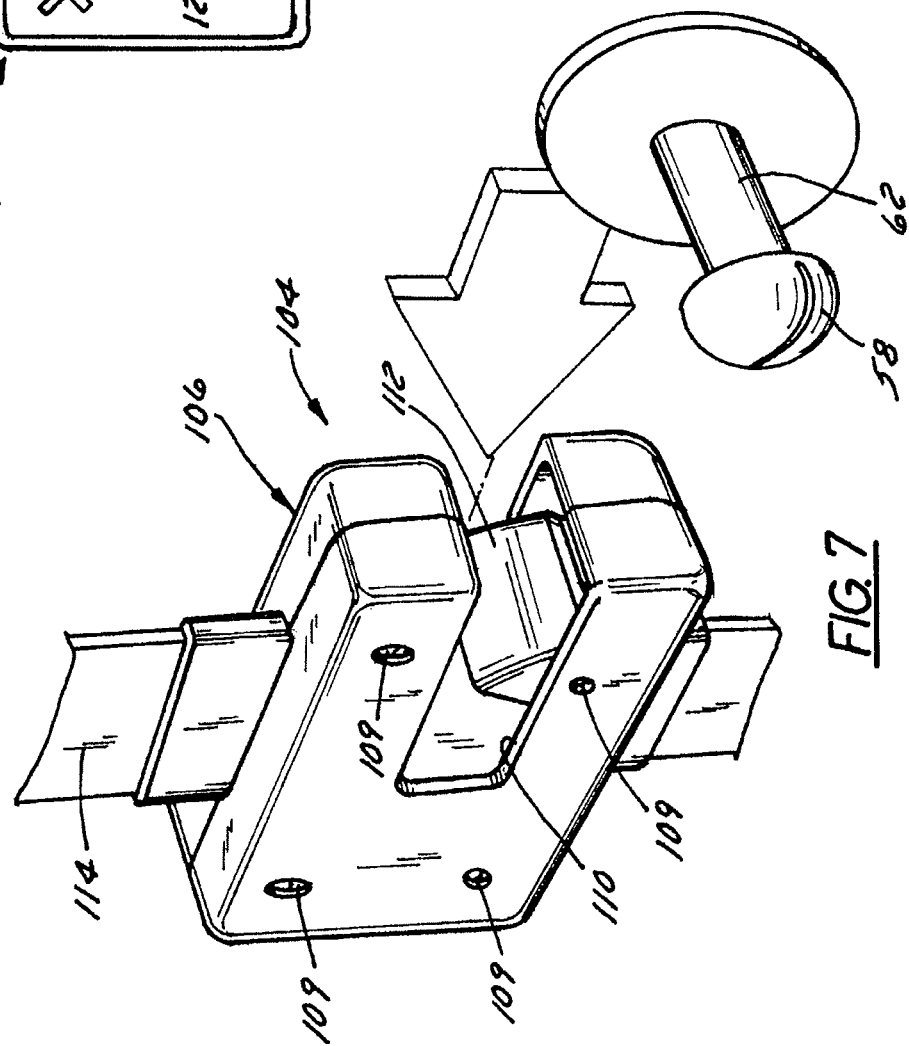
FIG. 8
FIG. 7

BICYCLE HUB LOCKING MECHANISM AND PARKING SYSTEM

CROSS-REFERENCE TO RELATED APPLICATIONS

This application is a Continuation of U.S. application Ser. No. 12/856,002, filed Aug. 13, 2010, which claims the benefit of U.S. Provisional Application No. 61/233,648, filed Aug. 13, 2009, both of which are incorporated herein by reference in their entirety.

BACKGROUND OF THE INVENTION

The present invention relates generally to bicycles and, more particularly, to a bicycle hub having an integral locking mechanism that cooperates with a bicycle parking stand or rack.

Automated bicycle rental systems have become increasingly popular. Such rental systems typically include a number of rental stations located across a city or other location. The rental stations typically include one or more bicycle stands for supporting a number of rentable bicycles. The bicycles are secured to the bicycle stands by a locking mechanism such that the bicycles are incapable of being removed until payment or identification for the rental of one of the bicycles is recognized.

The bicycle stands are in electronic communication with a rental kiosk or the like. User's of the rental system use the rental kiosk or other means to provide payment and/or identification information for renting of one of the bicycles for temporary use. Once the electronic means of the kiosk verifies the payment and/or identification, the kiosk enables the user the remove one of the bicycles secured to the bicycle stand by unlocking the locking mechanism. Thus, the user is free to take the bicycle and ride it around the city to go from place to place. When the user is finished riding the bicycle, he or she returns the bicycle to one of the bicycle stations and secures the bicycle to the bicycle stand for subsequent use by another user.

Known bicycle rental systems suffer from a number of disadvantages. For instance, such bicycle rental systems are susceptible to a great deal of wear and tear associated with the public use of the bicycles and bicycle stands of the bicycle rental systems. In addition, such publically located systems are susceptible to vandalism and theft. Further, such systems often require the users of the bicycles to lift or otherwise awkwardly manipulate the bicycles of the bicycle rental systems in order to engage or disengage the bicycle with the bicycle stand for storage or removal of the bicycle, respectively. Further, known bicycle rental systems often require relatively precise guidance of the bicycle with respect to the bicycle stand so as to engage the bicycle with the bicycle stand.

Thus, it is desired to provide an apparatus that overcomes at least one of the foregoing disadvantages.

SUMMARY OF THE INVENTION

The present invention provides a bicycle hub locking mechanism that allows bicycles to be selectively removed from a ground-based bicycle parking stand or rack. A front wheel hub assembly according to the present invention includes an axle that passes through the hub and secures the bicycle hub to the frame. A locking device or engagement member, such as a cap, is coupled to one or each end of the axle. The engagement member may be a cap that is generally frustro-conical in shape, comprises a substantially circular cross-section, and has an appearance that resembles the head of a mushroom. The engagement member is configured to slidingly engage a portion of a bicycle stand to securely couple the bicycle to the stand. Alternatively, the locking engagement member may comprise a nut or loop integrally formed at an end of the axle for securing the front hub of the bicycle to the bicycle stand.

The bicycle stand according to the present invention comprises a pair of spaced support members that define a bicycle parking space therebetween. One or each of a medial portions of the pair of spaced support members comprise a receiving member formed into a side wall of the support member. Preferably, the receiving member opens in two crossing directions. The receiving member is configured to cooperate with a lock and interact with the engagement member of the front hub assembly so as to selectively secure the front hub of the bicycle to the bicycle stand.

Understandably, one or more of the particular features and advantages discussed above may apply one or more of the various embodiments defined by the claims. It is appreciated that the aspects and features described above do not define the scope of the invention.

BRIEF DESCRIPTION OF THE DRAWINGS

FIG. 7 is an isometric partial view of a lock of the bicycle stand of FIG. 6 and an engagement member of the front hub assembly; and FIG. 8 is a schematic illustration of a the lock of FIG. 7 showing the lock in the locked and unlocked configurations.

DETAILED DESCRIPTION OF THE PREFERRED EMBODIMENTS

Figure 1:
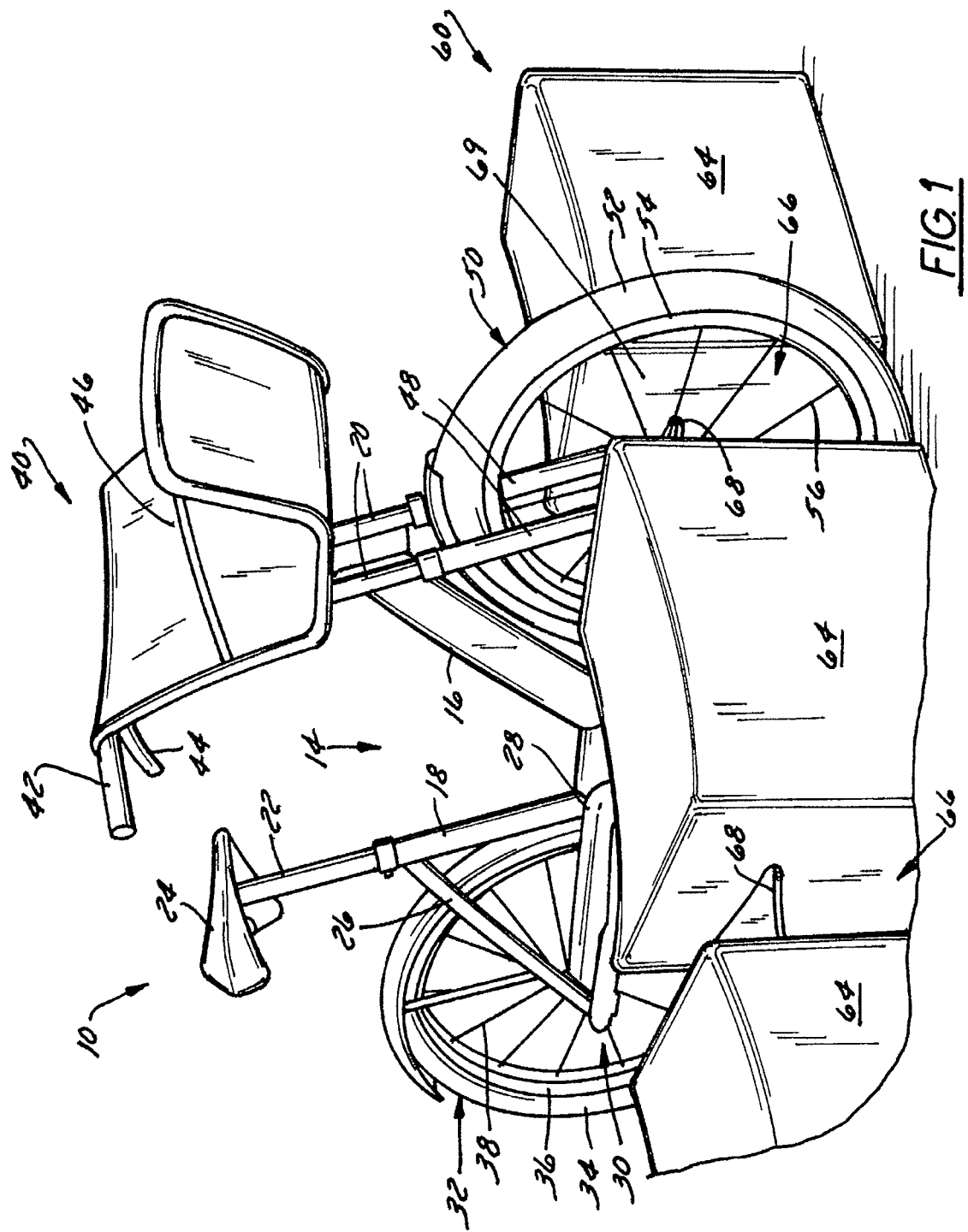
FIG. 1 is an isometric view of bicycle and a bicycle stand incorporating the bicycle hub locking mechanism and parking system according to one embodiment of the present invention.

Referring now to the drawings and, initially, FIG. 1, a bicycle 10 having a front hub assembly 12 constructed according to the present invention is illustrated. Bicycle 10 includes a frame 14 having a down tube 16 interconnected between a seat tube 18 and a head tube 20. A seatpost 22 is telescopically secured within the seat tube 18 and has a seat 24 for supporting a rider supported at an upward end thereof. The seatpost 22 is selectively adjustable to accommodate different heights of users of the bicycle 10. Although only down tube 16 laterally connects head tube 20 and seat tube 18, other bicycle frame configurations are envisioned such as those that may include a separate top tube extending between the head tube and the seat tube. As used herein, the term frame or bicycle frame is intended to encompass all such variations.

A pair of seat stays 26 and chain stays 28 extend rearwardly from seat tube 18 and support a rear hub assembly 30 of bicycle 10. Seat stays 26 connect the top of the seat tube 18 to the rear dropouts (not shown). Chain stays 28 extend generally parallel to a chain (not shown) of the bicycle 10 and connect to the rear dropouts. Rear hub assembly 30 rotatably supports a rear wheel 32. Rear wheel 32 comprises a tire 34 secured to a rim 36. Rim 36 includes a plurality of spokes 38 interconnected with the rear hub assembly for supporting the tire 34 of the wheel 32.

Referring to the forward end of bicycle 10, head tube 20 supports a handlebar assembly 40. Handlebar assembly 40 includes handlebars 42 for steering bicycle 10. Handlebar assembly 40 further includes handbrakes 44 which are operably coupled to brake assemblies (not shown) associated with one or both of the front and rear wheel assemblies. Bicycle 10 includes an optional storage container 46 that is coupled to handlebar assembly 40 and head tube 20. Storage container 46 is adapted for storing or otherwise securing items while a user is operating the bicycle.

Head tube 20 may be constructed as a pair of supports configured for supporting a bottom portion of storage container 46 or alternatively, head tube 20 may comprise a single tube like those generally known in the art. A pair of forks 48 extend downwardly relative to head tube 20 and are coupled to the hub assembly 12 of the front wheel assembly. Front hub assembly 12 rotatably supports front wheel 50. Front wheel 50 includes a tire 52 that is supported on a rim 54. Rim 54 includes a plurality of spokes 56 that extend radially between rim 54 and front hub assembly 12. Understandably, bicycle 10 of the present invention may comprise a number of different configurations in keeping with the spirit of the present invention. That is, bicycle 10 may comprise alternative frame, wheel, support and/or suspension features and structures.

Figure 2:
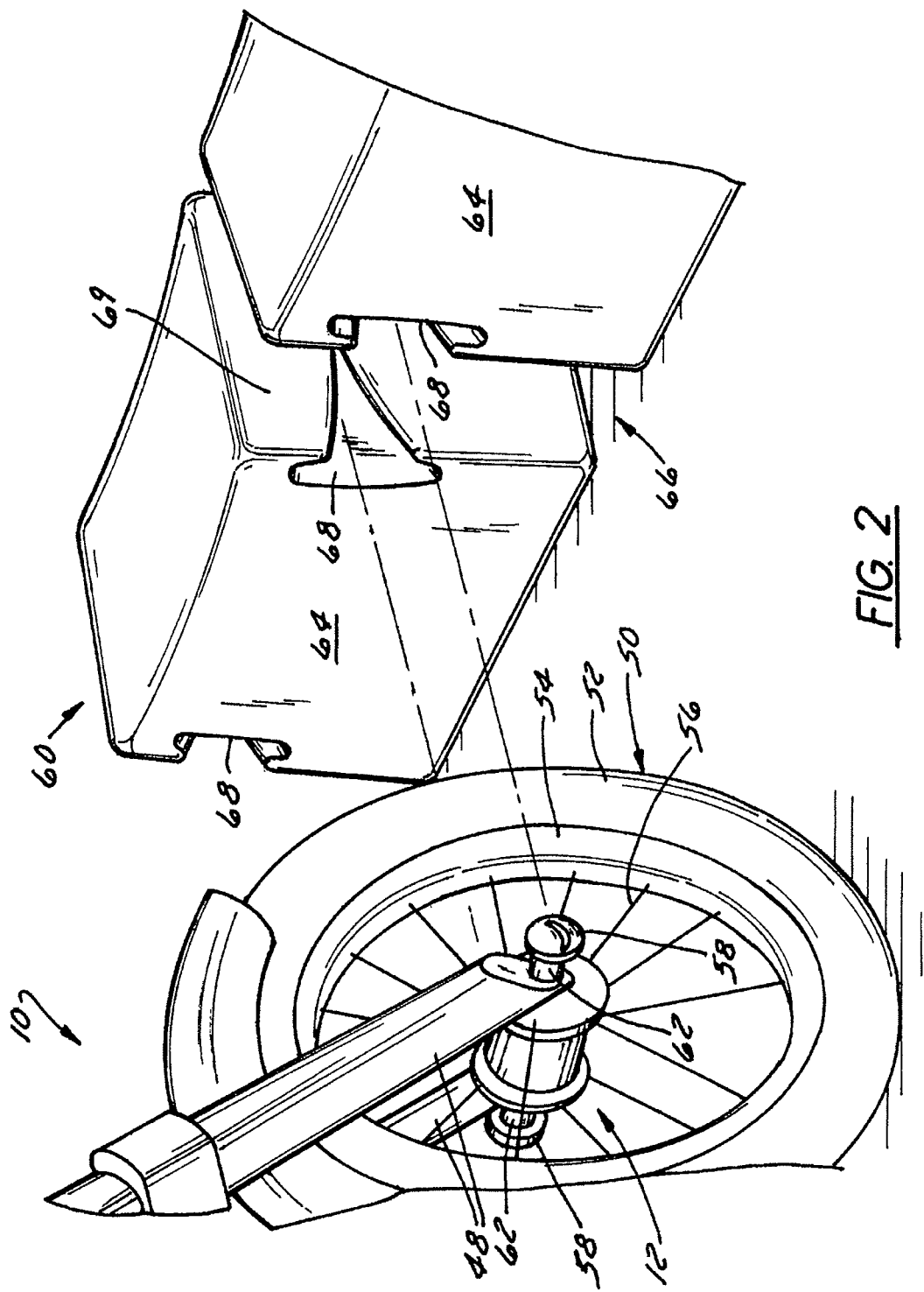
FIG. 2 is a partial isometric view of the bicycle and bicycle stand of FIG. 1 showing a front hub assembly of the bicycle in an unengaged position with respect to the bicycle stand.

Referring now to FIGS. 1 and 2, front hub assembly 12 according to the present invention includes a engagement member 58 that is fixedly coupled to the front hub assembly 12. Preferably, front hub assembly 12 includes a pair of engagement members 58, that is, one on each end of the front hub assembly 12. Engagement member 58 extends in an outward lateral direction relative an axle 62 of the front hub assembly 12. Engagement member 58 may comprise a mushroom-shaped cap structure or any other similarly shaped structure. Engagement member 58 is adapted to cooperate with a ground based bicycle stand 60, rack, or a bicycle docking location. Alternatively, engagement member 58 may comprise a nut or a loop configured to cooperate with bicycle stand 60. Preferably, bicycle stand 60 includes a pair of laterally spaced support members 64 that generally flank a front wheel so as to maintain a parked bicycle in a generally upright or vertical orientation. Understandably, a bicycle 10 according to the present invention may be constructed so that the rear hub assembly 30 may be constructed to include the engagement member 58 rather than the front hub.

Support members 64 are spaced apart from one another and define a front wheel parking space 66. Parking space 66 is configured to cooperate with the front wheel 50 of bicycle 10 to receive the front wheel 50 therebetween. Support members 64 according to the present embodiment comprise a substantially rectangular cross-section and are generally block-shaped so as to provide a spacing between adjacent support members 64 thereby providing an operator ample room to dismount the bicycle 10 once it has been docked at the bicycle stand 60. Each of support members 64 includes a medially positioned receiving member 68 positioned on one of the sidewalls 69 of the support members 64. Receiving members 68 are adapted to cooperate with the hub assembly 12 of bicycle 10. More particularly, receiving members 68 are sized and shaped to cooperate with engagement members 58 such that engagement members 58 can be slidably inserted into receiving members 68 of bicycle stand 60 such that the front wheel 50 of bicycle 10 is locked into place. Receiving members 68 may be a notch or similarly arranged receiver adapted for receiving at least a portion of engagement member 58. Understandably, support members 64 may be configured such that only one of the adjacent support members 64 defining the parking space 66 includes a receiving member 68. Correspondingly, front hub 12 may include an engagement member 58 on only one, corresponding side thereof.

Figure 3:
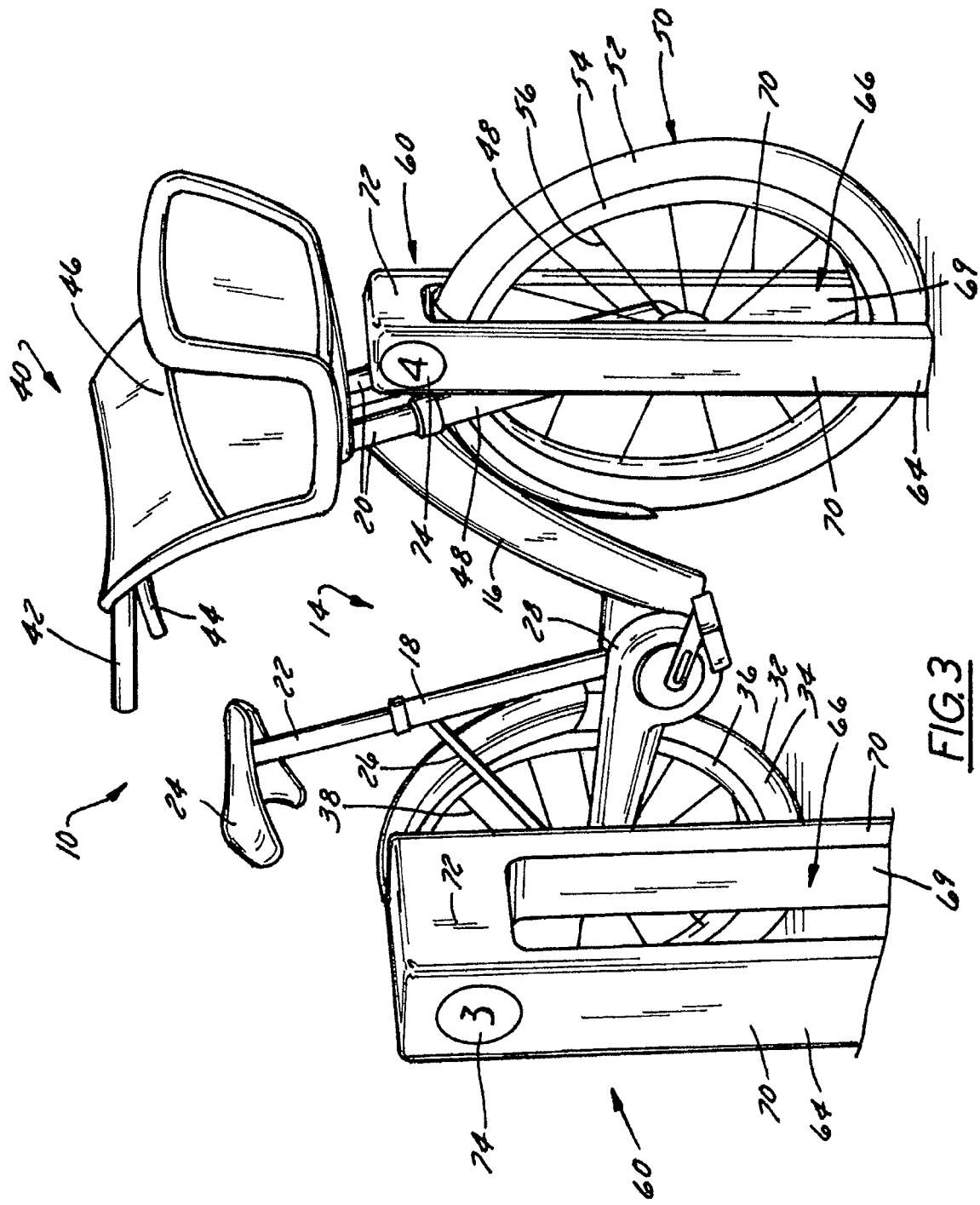
FIG. 3 is an isometric view of the bicycle of the present invention secured to a bicycle stand according to another embodiment of the invention.

FIG. 3 illustrates an alternative construction of the bicycle stand 60 according to the present invention. Support members 64 of bicycle stand 60 according to the present embodiment are generally inverted U-shaped. Support members 64 include a pair of legs 70 attached to the ground and extending vertically therefrom. Legs 70 are integrally coupled to one another by way of a laterally extending portion 72. Support members 64 define a parking space 66 between legs 70 and beneath laterally extending portion 72. As in the previous embodiment of bicycle stand 60, support members 64 include medially positioned receiving members 68 configured to cooperate with the engagement members 58 of the front hub assembly 12 to thereby slidingly receive engagement members 58 therein to secure bicycle 10 to bicycle stand 60. Support members 64 of bicycle stand 60 may include indicia 74 on a lateral surface thereof for identifying support members 64 of bicycle stand 60. Support members 64 may have a substantially rectangular lateral cross section, alternatively, support members 64 may comprise any other suitable cross-sectional shape including, but not limited to, trapezoidal. As in the previous embodiment, support members 64 may include only a single receiving member 68 and front hub 12 may correspondingly include only a single engagement member 58.

Figure 4:
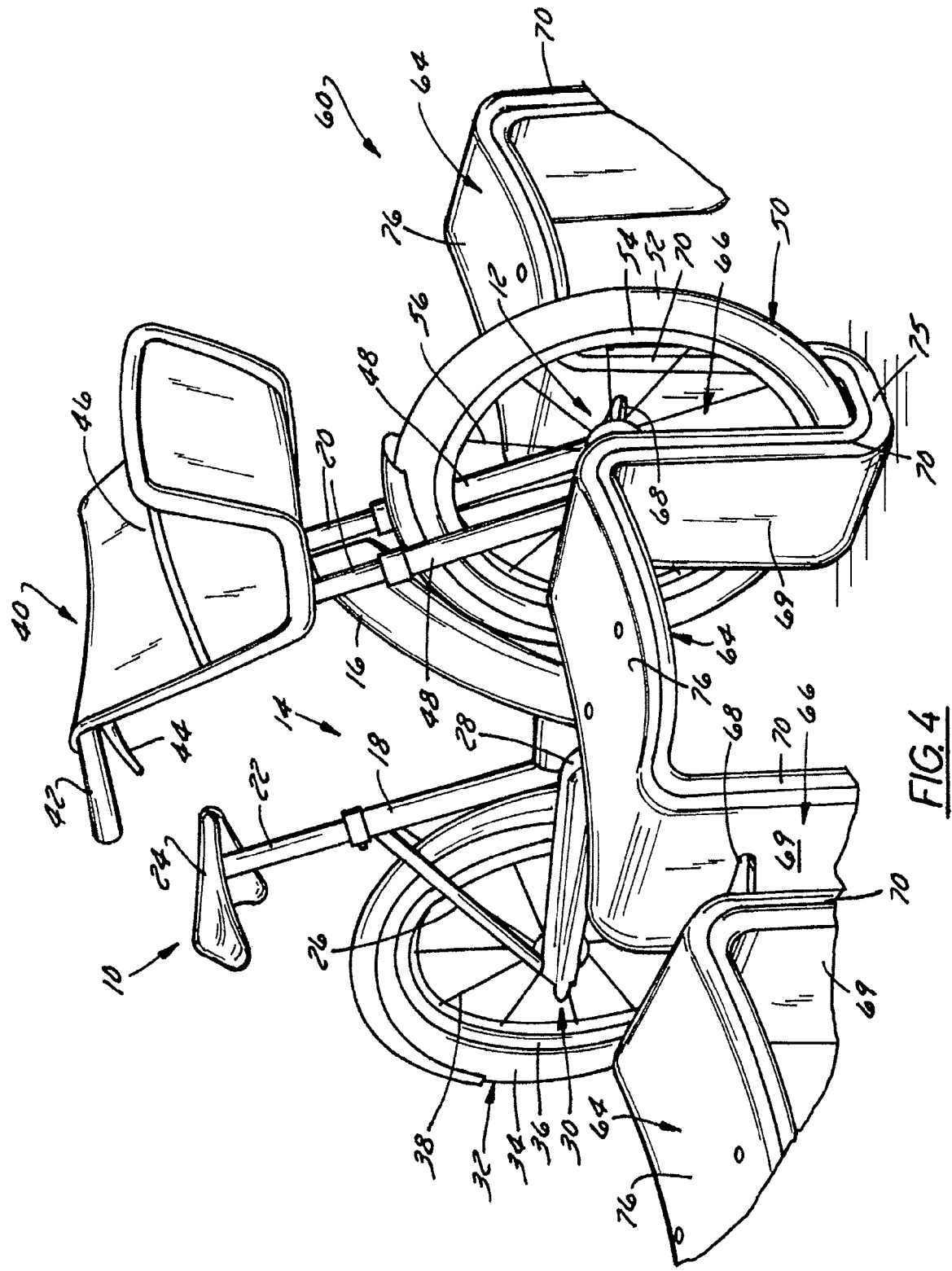
FIG. 4 is an isometric view of the bicycle of the present invention secured to a bicycle stand according to yet another embodiment of the invention.

Referring now to FIG. 4, yet another embodiment of the bicycle stand 60 according to the present invention is illustrated. Bicycle stand 60 of the present embodiment includes a plurality of spaced support members 64 interconnected to one another by a laterally extending portion 75 that extends along the ground surface to define a parking space 66 that is generally U-shaped such that the laterally extending portion 75 defines a resting place for the front wheel 50 of bicycle 10. Support members 64 define a pair of vertically extending legs 70 integrally formed with lower laterally extending portions 75 to cooperate to define the U-shaped parking space 66. Each of legs 70 includes receiving members 68 for receiving engagement members 58 of the present invention. Stand 60 according to the present embodiment includes a plurality of interconnected support members 64 to define a plurality of receiving spaces 66 for docking a plurality of bicycles 10. The support members 64 are interconnected with one another by way of upper laterally extending portions 76. Once again, support members 64 may be configured so that only one of the adjacent support members includes a receiving member 68 and bicycle 10 may have a front hub 12 that includes a single, corresponding engagement member 58 as is readily understood.

Figure 5:
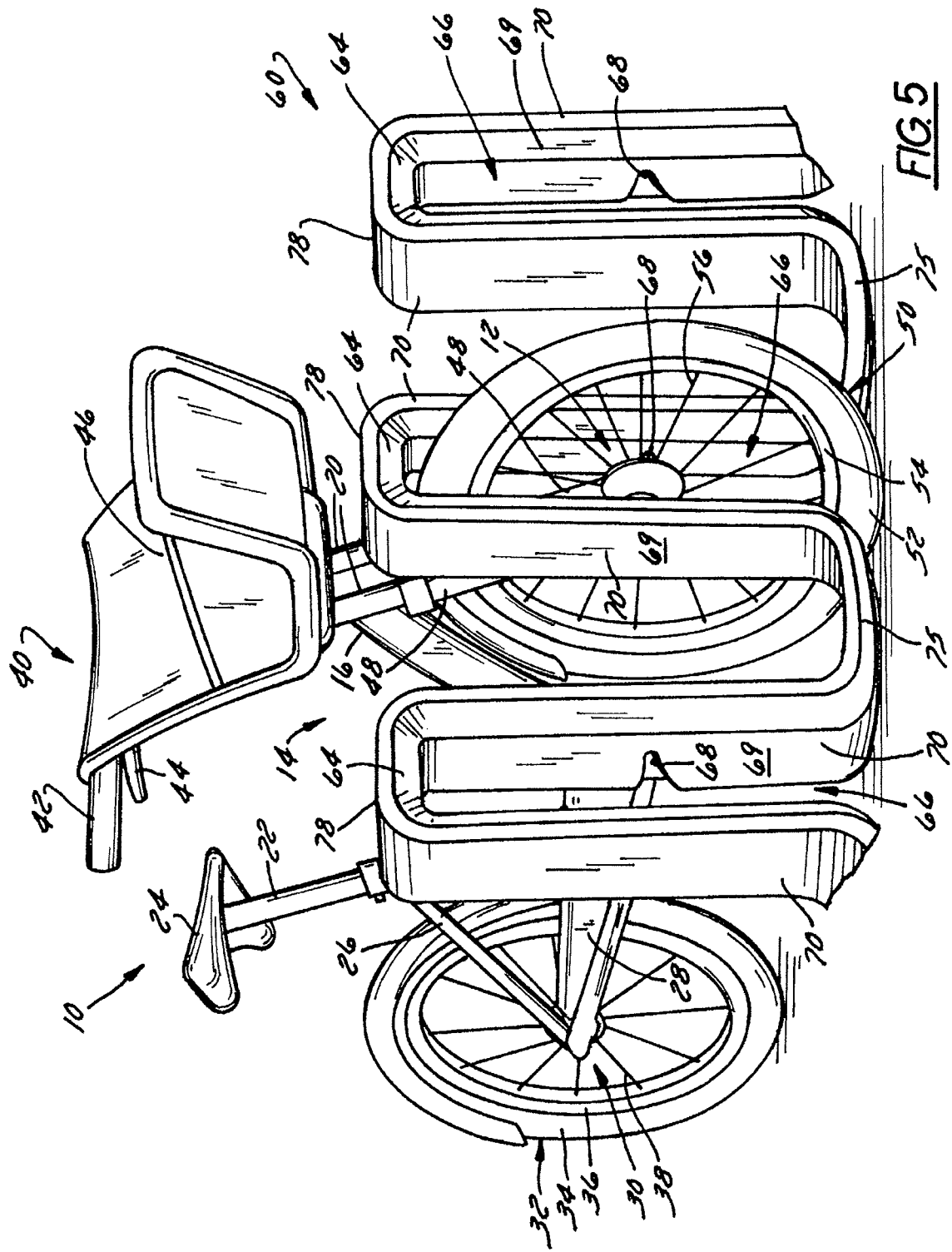
FIG. 5 is an isometric view of the bicycle of the present invention secured to a bicycle stand according to still another embodiment of the invention.

FIG. 5 illustrates another embodiment of bicycle stand 60. Bicycle stand 60 comprises a plurality of interconnected support members 64 configured to define a plurality of receiving spaces 66 for securing a plurality of bicycles 10. Support members 64 comprise a pair of vertically extending legs 70 integrally connected to one another by way of a laterally extending portion 78 to define the receiving spaces 66. As in the previous embodiments, the legs 70 include medially positioned receiving members for slidably receiving engagement members 58 of the front hub assembly 12 of bicycle 10. The support members 64 are joined to one another by way of lower laterally extending portions 75 which define a space between receiving spaces 66 to enable a rider to mount and dismount the bicycle 10 free of interference from an adjacent bicycle 10.

It is envisioned that each of the various embodiments of the present invention can be configured to accommodate parking from one side, for those applications where space proximate the rack is limited or wherein the rack will be positioned adjacent a structure such as a building, or accommodate parking from both sides where space permits. It is appreciated that in those instances where parking from both sides of the rack is possible, staggering adjacent parking stalls to alternate sides of the parking rack maximizes parking concentration in a manner that allows adequate space adjacent each bicycle for rider mounting and dismounting. It is appreciated that, regardless of the specific orientation of the parking system, the parking rack can be configured to cooperate with a number of bicycles and bicycles having different configuration provided the bicycles are equipped with the hub locking system that cooperates with the bicycle rack. Once again, support members 64 may be configured so that only one of the adjacent support members includes a receiving member 68 and bicycle 10 may have a front hub 12 that includes a single, corresponding engagement member 58 as is readily understood.

Figure 6:
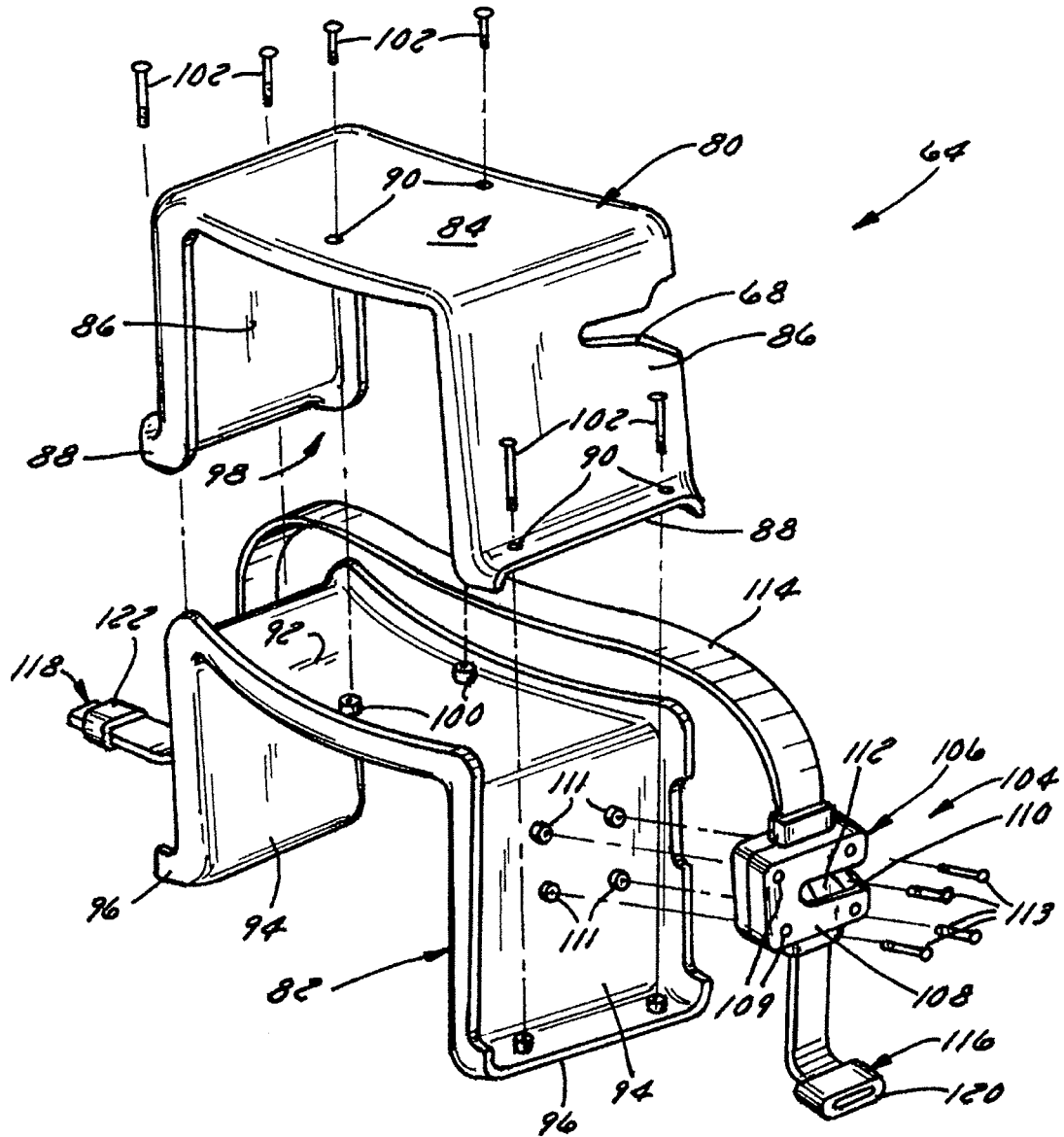
FIG. 6 is an isometric, exploded view of a support member of the bicycle stand of FIGS. 1 and 2.

Referring now to FIG. 6, a representative embodiment of a support member 64 of bicycle stand 60 is illustrated. Support member 64 includes an outer housing 80 and an inner housing 82. Outer housing 80 includes an upper surface 84 and a pair of sides 86. Each of the sides 86 defines a flange 88 extending outwardly with respect to support member 64. A pair of apertures 90 are provided on each of flanges 88 and upper surface 84. Inner housing 82 has a shape, contour, and a structure that generally corresponds to the shape, contour, and structure of outer housing 80. Inner housing 82 includes an upper surface 92 and a pair of sides 94 that define outwardly extending flanges 96. Inner housing 82 is configured to be securely received within a cavity 98 defined by upper surface 84 and sides 86. Inner housing 82 includes a pair of recesses 100 on upper surface 92 and each of flanges 96. Recesses 100 are positioned so as to be aligned with apertures 90 of outer housing 80. Fasteners 102, such as screws or bolts, are provided for insertion through apertures 90 and engagement with recesses 100 to secure the outer housing 80 to the inner housing 82. Each support member 64 defines one lateral wall of a pair of adjacent recesses for receiving front wheels 50 of a pair of adjacent bicycles 10 as previously discussed.

A locking assembly 104 is secured between outer housing 80 and inner housing 82. Locking assembly 104 comprises a pair of locks 106 that are laterally positioned with respect to support member 64. Locks 106 cooperate with receiving members 68 provided on each side 86 of outer housing 80 such that engagement members 58 may be slidably inserted into the receiving members 68 so as to engage locks 106 for locking bicycle 10 to bicycle stand 60. Locks 106 comprise a body 108 having a substantially rectangular cross section. Body 108 includes a number of apertures 109 configured to be aligned with and cooperate with a number of corresponding recesses 111 in sides 94 of the inner housing 82. Fasteners 113 are inserted through apertures 109 and into engagement with recesses 111 to secure the locks 106 to inner housing 82.

The body 108 includes a receiving member 110 that extends rearwardly from a vertically extending forward side of body 108. Receiving member 110 houses a selectively moveable pin 112. Pin 112 is configured for selective engagement with engagement members 58 of bicycle 10 to secure engagement members 58, and thereby bicycle 10, relative to bicycle stand 60 as described further below.

Locks 106 are coupled to one another by way of a strap 114. Strap 114 is configured to cooperate with the size and shape of housings 80, 82 so as to be secured therebetween without interfering with the interconnection therebetween. Strap 114 includes a first end 116 and a second end 118 opposite first end 116. First end 116 includes a female connector 120 and second end 118 includes a male connector 122. Female connector 120 is configured to engage a male connector 122 of an adjacent support member 64. Likewise, male connector 122 is adapted to engage a female connector 120 of an adjacent support member 64. Accordingly, support members 64 are coupled to one another by way of connectors 120, 122.

Locks 106 are interconnected with a plurality of other locks 106 via strap 114. Bicycle stand 60 is preferably in communication with an electronic kiosk (not shown) or similar such system located proximate or remote from bicycle stand 60. Bicycle stand 60 is adapted for transmitting the status of receiving spaces 66 to the kiosks such as to whether a particular parking space 66 is occupied or whether the bicycle 10 is locked or unlocked. The electronic kiosk preferably includes means for allowing a user to submit payment for renting a bicycle 10 according to the present invention such that when the user submits payment, the kiosk transmits a signal along strap 114 to unlock one of locks 106 to allow the user to remove the bicycle 10 for riding. It is appreciated that the functionality of the kiosk could be integrated and/or physically connected to the securable parking rack. It is further envisioned that one or more racks within a bicycle ridable range be interconnected for communication with one another. It is envisioned that a consumer at an empty rack interact with the rack or kiosk so as to be advised of a nearest available bicycle secured at another rack. Inversely, a consumer or renter wishing to return a bicycle and coming upon a full rack, may interact with the rack and/or kiosk so as to locate the nearest rack with available parking. It is further envisioned that each rack/kiosk interact via a web based portal so that possible consumers can locate an assess rack and bicycle quantity conditions from locations remote from any rack. It is further envisioned that such an interface allow users to reserve a bicycle at a given location for a given duration. It is envisioned that indicia 74 provide an indication to consumers proximate a given rack or kiosk that a particular vehicle is no longer available for use even though the vehicle is present and secured. Such a system allows efficient managing of bicycle stocks.

Referring now to FIG. 7, an exemplary embodiment of a lock 106 is illustrated. Pin 112 of lock 106 is preferably a hydraulically operable pin, though any other suitable such latching pin may be used in carrying out the present invention. That is, it is envisioned that electric, pneumatic, and mechanical locking systems are equally applicable to the present invention. Although pin 112 may directly interact with a respective engagement member 58, pin 112 interacts with a toggle arm 124 that is rotatably attached to lock 106. As shown in FIG. 8, pin 112 is selectively actable so as to be positioned in one of a raised and lowered position so as to lock and unlock lock 106 respectively. When raised, pin 112 interferes with counterclockwise rotation of arm 124. Said in another way, arm 124 can rotate in a clockwise direction, such as for parking of a bicycle at an open position of a respective rack, but cannot rotate in a reverse direction thereby retaining a parked bicycle 10 relative to lock 106. When the appropriate authorization is provided indicating that a bicycle has been rented or is authorized for removal, pin 112 retracts so that arm 124 is free to rotate in either direction including a counterclockwise direction necessary for disengagement of engagement member 58 from lock 106.

It is appreciated that pin 112 may directly interact with engagement member 58 so that, when pin 112 is in the raised position, pin 112 is configured such that it may be selectively engaged to receive engagement member 58 of front hub assembly 12 to thereby secure bicycle 10 to bicycle stand 60. However, when pin 112 is in the raised or locked position, a bicycle 10 docked at bicycle stand 60 may not be removed from bicycle stand 60. Regardless if pin 112 interacts with an arm 124 or directly interacts with hub 12, a bicycle 10 parked at bicycle stand 60 is secured in place and may not be removed without first moving pin 112 to an unlocked position.

Although pin 112 is shown as being operable in a direction that is generally aligned with an orientation of arm 124, it is envisioned that pin 112 could interact with arm 124 in a direction that is generally aligned with an axis of the pivot of arm 124 and/or be configured to interact with the axis of rotation of arm 124 so as to prevent movement of arm 124 when pin 112 is in the locked position.

Thus, in operation, a user wishing to rent a bicycle 10 may make a payment at an electronic kiosk or remote interface. Once payment is received and verified, and/or appropriate bicycle authorization has been confirmed, the kiosk transmits a signal to the bicycle stand associated with a specified parking space 66 to lower pins 112 associated with the corresponding support members 64. As such, an individual may simply mount bicycle 10 associated with parking space 66 and remove bicycle 10 therefrom by slidingly moving engagement member 58 out of receiving member 110 of lock 106. When an individual wishes to return a bicycle to particular parking space, the individual may simply engage locks 106 with engagement members 58 of bicycle 10 to thereby return and secure the bicycle in place. Preferably, each bicycle 10 includes a bicycle specific identifier so that, upon return, even at a non-originating parking space 66 or even a different parking rack, the bicycle parking and securing system can readily identify specific bicycles that have been returned to inventory and those bicycles that have not been returned to inventory.

It is specifically intended that the present invention not be limited to the embodiments and illustrations contained herein, but include modified forms of those embodiments including portions of the embodiments and combinations of elements of different embodiments as come within the scope of the following claims.

What is claimed is:

1. A bicycle parking system, comprising:
   a first support member including a first fixed notch and a first lock configured to obstruct a portion of the first notch, and
   a second support member including a second fixed notch and a second lock configured to obstruct a portion of the second notch;
   wherein:
   the first support member and the second support member are configured to flank a bicycle frame;
   the first fixed notch and the second fixed notch are a fixed distance apart;
   the first notch is configured to slidingly accept a first rigid engagement member mounted on a fork of the bicycle frame;
   the second notch is configured to slidingly accept a second rigid engagement member mounted on the fork of the bicycle frame;
   the first lock is configured to capture the first rigid engagement member;
   the second lock is configured to capture the second rigid engagement member; and
   the first lock comprises an arm configured to obstruct the portion of the first notch and a pin configured to lock the arm.

2. The bicycle parking system of claim 1, wherein the bicycle can be selectively secured relative to the support members when the locks are in a locked position and the bicycle can be removed from the support members only when the locks are in an unlocked position.

3. The bicycle parking system of claim 2, wherein the portion of the first notch is an entrance to the first notch.

4. The bicycle parking system of claim 1, wherein the first notch and the second notch are located at about a height of an axle of the bicycle frame and the fixed distance apart is horizontal.

5. The bicycle parking system of claim 1, wherein the first notch is a horizontal groove in a side of the first support member and exposed on a front of the first support member.

6. The bicycle parking system of claim 1, wherein the first lock and the second lock are configured to be electronically controlled.

* * * * *